Jan. 31, 1939.   C. A. NICKLE   2,145,732
MIRROR
Filed Nov. 16, 1937
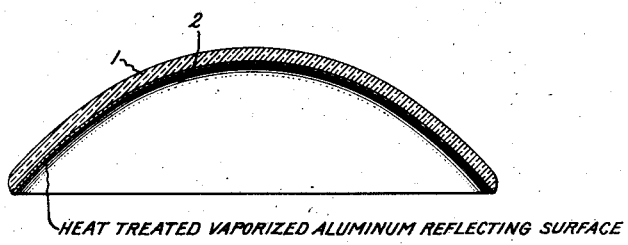
HEAT TREATED VAPORIZED ALUMINUM REFLECTING SURFACE
Inventor:
Clifford A. Nickle,
by Harry E. Dunham
His Attorney.

Patented Jan. 31, 1939

2,145,732

UNITED STATES PATENT OFFICE 2,145,732

MIRROR

Clifford A. Nickle, Schenectady, N. Y., assignor to General Electric Company, a corporation of New York Application November 16, 1937, Serial No. 174,809

4 Claims. (Cl. 91—69.1)

My invention relates to mirrors and more particularly to mirrors comprising glass provided with reflecting films of vapor deposited metal.

One object of my invention is to provide a process for stabilizing the deposited metal.

For a better understanding of my invention, together with other and further objects thereof, reference is had to the following description taken in connection with the accompanying drawing, and its scope will be pointed out in the appended claims.

It is now known that metal such as aluminum, for example, may be vaporized, preferably in a vacuum, and then deposited in a film, or coating, on a glass surface to form a mirror surface of exceptionally high reflectivity. One such process is disclosed in U. S. Patent 1,584,728 issued to Case. The metal in accordance with this process is vaporized under high temperatures from a quantity of thin metal contained in a crucible and rises as a vapor of minute particles to the cool walls of a vacuum chamber. By placing glass plates, or forms such as are used for reflectors in projectors, near the cool walls of the vacuum chamber, a deposit of metal is obtained in the form of a thin film. This deposit is continued until a substantially light-impervious coating is obtained. It has been found, however, that when mirrors made in this way are required to be cleaned frequently, as in the case where they are used in projectors in which arc lamps are used as the source of light, for example, the frequent cleaning which is necessary removes the metal film from the glass.

In accordance with my invention, this disadvantage is overcome by heat treating the deposited metal film before the mirror is used. I have found that by heating the deposited layer to a temperature of substantially 150° C., the deposited particles of metal form a tough continuous or homogeneous coating which will not be injured by the cleaning cloth or other cleaning means ordinarily used for this purpose. The reflectivity of the surface of the coating as a result of this heat treatment also remains substantially constant.

In the accompanying drawing, I have illustrated in section, a mirror of the type used in projectors. This mirror is of glass shaped as a paraboloid upon the concave surface of which aluminum is deposited by a known vapor process. In the drawing, 1 indicates the glass of the reflector and 2 indicates the light reflecting film or coating. In accordance with my invention, this form with the deposited film of aluminum thereon is placed in an oven and is heated up to a temperature of 150°. The change of state, or rather crystallization, of the vapor deposited aluminum film takes place at a uniform temperature of 110° C. I find, however, that raising the temperature above this value during the treatment insures a uniform product, and I therefore prefer to raise the temperature of the mirror to 150°, after which the mirror is allowed to cool. The actual sintering temperature of aluminum is 250° C. I find, however, that heating the mirror to 150° effects a change of state or a crystallization and a toughening of the aluminum film as though it were actually sintered.

The time required for bringing the deposited coatings up to the proper temperature is not critical. The time should, therefore, be regulated in accordance with the requirement of the form upon which the metal coating is deposited.

What I claim as new and desire to secure by Letters Patent of the United States, is:—

1. The process of stabilizing vapor deposited metal reflecting coatings upon vitreous surfaces which comprises heat treating said deposited metal at temperatures substantially below the actual sintering temperature for that metal but not below 110° C.

2. The process of stabilizing vapor deposited aluminum reflector coatings upon a glass base which comprises heating said deposited coating up to a temperature between 110° C. and 150° C. and then allowing it to cool.

3. The process of stabilizing vapor deposited aluminum reflecting coatings upon a vitreous surface which comprises heating said deposited coating up to a temperature of the order of 150° C.

4. A process of stabilizing vapor aluminum mirror coatings deposited upon glass and having a thickness sufficient to be substantially opaque to light rays which comprises heating said mirror coating to a temperature between 110° and 150° C., and thereafter allowing it to cool to room temperature.

CLIFFORD A. NICKLE.